United States Patent [19]

Kroczynski

[11] Patent Number: 4,674,949

[45] Date of Patent: Jun. 23, 1987

[54] ROBOT WITH CLIMBING FEET

[75] Inventor: Patrice A. Kroczynski, Vitry, France

[73] Assignee: International Robotic Engineering, Inc., New York, N.Y.

[21] Appl. No.: 537,367

[22] PCT Filed: Jan. 10, 1983

[86] PCT No.: PCT/FR83/00005

§ 371 Date: Feb. 15, 1984

§ 102(e) Date: Feb. 15, 1984

[87] PCT Pub. No.: WO83/02419

PCT Pub. Date: Jul. 21, 1983

[30] Foreign Application Priority Data

Jan. 11, 1982 [FR] France .................. 82 00275

[51] Int. Cl.⁴ .............................. B25J 5/00
[52] U.S. Cl. .......................... 414/750; 114/222; 414/1; 414/730; 414/732; 414/753; 414/744 A; 414/626; 901/1; 901/50; 901/30; 180/901; 180/8.5; 180/8.6; 248/363
[58] Field of Search ............ 114/222; 414/1, 7, 730, 414/626, 750, 751, 752, 753, 729, 732, 744 A; 901/1, 50, 30; 180/901, 8.5, 8.6; 248/363

[56] References Cited

U.S. PATENT DOCUMENTS 3,409,854 11/1968 Swallert .
3,612,201 10/1971 Smith .................... 180/8.6
4,119,900 10/1978 Kremnitz ................ 901/1 X
4,227,853 10/1980 Woodford et al. ........ 901/30 X

FOREIGN PATENT DOCUMENTS 2293992 8/1976 France .................... 901/1
0010034 9/1978 France .

Primary Examiner—Frank E. Werner
Attorney, Agent, or Firm—Charles E. Temko

[57] ABSTRACT

Self-contained apparatus able to move along a non-horizontal surface and comprising a first train and a second train (48) connected to the first train by devices allowing to obtain a relative displacement by translation and rotation in a plane parallel to the surface, and first and second holding devices (2) carried respectively by the first and the second trains and able to fix removably the apparatus on the surface, wherein the holding devices carried by at least one of the trains are connected to the train through devices capable of displacing said train with respect to the holding devices in a direction perpendicular to the surface. Preferably, the holding devices (2) of the first train are comprised of a plurality of adherence devices forming a polygon and arranged outside the center of the holding devices of the second train, and the apparatus further comprises a processing or inspection tool (60) mounted so as to pivot with respect to the first train.

11 Claims, 10 Drawing Figures

ROBOT WITH CLIMBING FEET

This invention relates to an independent apparatus capable of moving along a non-horizontal surface, for example along a vertical surface or on a ceiling.

One application of such equipment relates to the painting or the scraping of ships' hulls.

Document U.S. Pat. No. 3,409,854 describes an apparatus intended for such uses; it comprises a first train equipped with three electro-magnets, a second train equipped with one single electro-magnet and connecting means comprising an intermediate element capable of gliding in relation to the first train and capable of rotating in relation to the second train. This intermediate element is supporting the tools for treating the surface. It will be understood that by actuating separately and successively the electro-magnets of the first train and of the second train while allowing the intermediate element to slide or to rotate, the apparatus is capable of moving at will along a flat surface. Such an apparatus can only operate on surfaces the curvature of which is very slight as it is in fact only on account of the clearances between the various elements of the apparatus that correct contact between the electro-magnets and the supporting surface is obtained if the latter is not absolutely flat; if said clearances are too considerable they can, during displacement, bring one of the electro-magnets at a distance of the supporting surface such that there is no adhesion and the apparatus is not supported in a suitable manner. The fact that the second train is equipped with only one electro-magnet increases this risk as it ensures only reduced stability, if a too considerable weight is to be avoided.

The fact that the tools are integral with the intermediate element results in the disadvantage that the tools can only be displaced to treat the surface at the same time as the one of the trains. They can only effect a translation movement or at most a rotating movement, thus causing waste of time if the forces brought into play are not very considerable; furthermore the holding force of the two trains cannot be used at the same time; this is a limitation in the case of considerable forces.

Patent FR-A-2.221.243 describes an apparatus which comprises two trains which can move in relation to each other by a relative translation in two directions, with no rotation. Each train is equipped with two electro-magnets. The trains may be articulated or curved beforehand to adapt to the curvature of a surface. This apparatus offers the same disadvantages at the previous one as far as its stability is concerned when moving; it is, on the other hand ill-adapted to displacements or surfaces the curvature of which varies, such as a ship's hull, as the presence of articulations harms its rigidity and make the system heavier; it is also impractical to have to change train each time the surface changes.

The trains can furthermore not change their direction as no rotation is possible for a treatment tool supported by one or the other train which therefore also keeps the same direction, or—if it can oscillate around an average position, its possible directions are limited by the angle of its oscillations.

In FR.-A-1.205.668 there is described a transport device intended for displacements on horizontal ground; its structure is more or less the same as that describe in FR.-A-2.22.243 with the exception that each train supports four extensible feet. This device is therefore capable of moving on irregular ground but is devoid of means enabling it to grip onto a high gradient slope; it also is not equipped with any tools.

Thus there does not exist—as far as the inventor is concerned—any apparatus which is capable of easily and independently move along a curved, high gradient slope for purposes of inspection and/or treatment.

The aim of this invention is to provide such an apparatus, which would be of a very simple construction and would offer great safety.

Another aim of the invention is to provide such an apparatus capable of being used both rapidly for rapidly sweeping considerable surfaces while bringing into play only low forces, and for very safely treating surfaces while bringing into play considerable forces.

Another aim of the invention is yet to provide an apparatus which would easily be used as an independent robot.

The present invention therefore provides an independent apparatus capable of moving along a non-horizontal surface; it comprisea a first and a second train connected to the first by means which allow their relative displacement by translation and by rotation within a plane parallel to the surface as well as first and second holding means borne respectively by the first and the second train, capable of firing the apparatus onto the surface in a removable manner; the said apparatus is characterised in that the means of holding are borne by at least one of the trains and are connected to the said train by means of devices capable of displacing the said train in relation to the said holding means in a direction perpendicular to the surface.

According to interesting modes of application of the apparatus in accordance with the invention, said holding means of the first train are made of several gripping devices arranged in a polygonal manner and are placed externally to the centre of the holding means of the second train; the said apparatus comprises furthermore a treatment or inspection tool and is characterised in that the said tool is mounted so as to be able to rotate in relation to the said first train.

According to a mode of embodiment, the said treatment or inspection tools is connected to one of the two trains by means of an articulated arm; the said articulated arm is preferably a robotic arm with several articulations provided each with means of control.

The holding means of the second train are advantageously formed by several gripping devices arranged in a polygonal manner the centre of which can move inside the polygon formed by the holding devices supported by the first train; the dimensions of both these polygons are calculated in such a manner as to allow the displacement of the tool during the tool's operation without any risk for the apparatus' stability According to another mode of embodiment the said tool, for treatment or inspection is rigidly connected to the second train; the means which allow the relative displacement by rotation of the two trains to be obtained are designed in such a manner as to also allow a pivoting movement of the tool to be obtained.

In one or the other mode of application, the means capable of displacing one train in a direction perpendicular to the surface in relation to the holding means connected to the said train, are preferably supported by the first train.

In one mode of application wherein the apparatus comprises a controlling computer, the apparatus is equipped with pick-ups sensitive to the relative translations and rotations of the two trains; the computer is equipped with a storage capable of recording said translations and rotations, as well as the periods during which the various holding means are in operation; the computer is also equipped with means capable of deducing from said data, indications on the resulting movement of the apparatus and on his actual position.

The invention is now going to be explained in more details by means of various non-limiting practical examples and illustrated by drawings among which:

Figure 1:
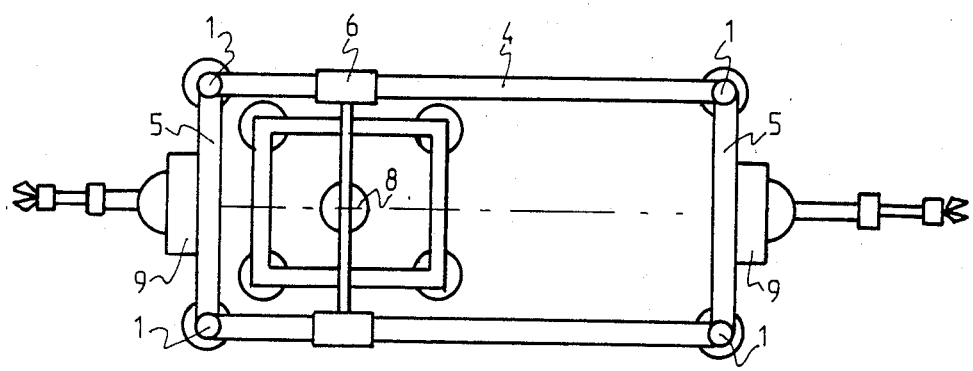
FIG. 1 is a robot, seen from above, equipped with four jacks on the main structure and two working modulus.

In accordance with FIGS. 1 to 6, four jacks 1 are provided at the end of the rod and by means of a swivel joint 3, with a pneumatic suction cup 2.

It should be understood that magnetic suction cups (or electro-magnets) as well as mixed suction cups combining the actions of a pneumatic and a magnetic suction cup may also be used.

The jacks are made integral by means of a main structure comprising two longitudinal beams 4 and two transversal beams 5; they constitute the first train.

This working structure is necessary to obtain a satisfactory stability of the robot when it performs jobs which bring considerable robot/wall stresses into play.

The second train 8 is made of 4 beams which form a rectangular compensation bar 48 which is connected to beams 4 by means of a sliding device 6 provided with a motorised rack system of translation; the said system can also comprise jacks, chains etc . . . Between the sliding device 6 and the compensation bar there is inserted an actuator 7 which ensures the rotation of the compensation bar around an axis perpendicular to its plane.

The compensation bar supports, by means of swivel joints 3, suction cups of the same magnetic type as those described above. Said suction cups are arranged in a rectangular shape the centre of which is forced to move within the greater rectangle formed by the suction cups affixed to the first train. In the example described, corresponding to the preferred mode of embodiment, the suction cups of the external rectangle affixed to the jacks are forming the greater rectangle; it is obviously also possible to place the jacks on the inner suction cups; this arrangement demands however a far greater accuracy when operating the jacks. If the surface assumes most irregular shapes it is even possible to provide jacks for all the suction cups.

There is provided, on the beams 5, a fixing device for the working arm 9. Said arms, of the robotic articulated type fitted with an articulated wrist for the automatic change of tools, allow the robot to perform its tasks. A tool rack is provied in the box attached to the working arm 9.

The jacks are operated pneumatically; the working structure formed by the beams 4 and 5 allows, in another variation, to fix screw jacks In order to advance in one direction the robot can, in succession carry out the following operations (see FIGS. 3 and 4):

A: starting position; the suction cups of the jacks 1 are gripping, the jacks 1 are in a low position; the suction cups of the second train are in contact with the wall;

B: the jacks 1 are actuated, the partial vacuum in the suction cups of the second mobile train is stopped. Jacks 1 assume an extended position.

C: translation of the second train from one to the other side of the robot. It is the length of this translation that determine the robot's step.

D: jacks 1 are brought to a retracted position so as to bring the suction cups of the second train in contact with the wall. The suction cups are then depressed: (in the case of magnetic suction cups this operation corresponds to a maximum magnetisation)

E: Partial vacuum in the suction cups of jacks 1 is stopped; jacks 1 are in position (high position); the robot rests solely on the suction cups of the second mobile train;

F: translation of the main structure in relation to the second train, from one to the other side. After this operation the initial position (A) is resumed and the process can start again.

It should be noted that the maximum stability working position is the position wherein the four external suction cups are gripping. For light work such as painting, the work can be almost continuous. In order to achieve this, the translation (F) will be carried out at a low speed, whereas all other movements will be carried out at high speed. This manner of proceeding allows the use of the degree of translation freedom of the robot as the degree of freedom of the tool and to therefore decrease the complexity and the cost of the robotic arm 9; it is for example not suitable however for scraping operations as these bring considerable stresses at the tool level into play. In this case is preferably to operate when stopping. All the suction cups of both trains can even be made to grip.

In order to direct the progression of the robot in one direction, it can successively carry out the following operations:

(1) the jacks 1 are in an extended position; the suction cups of the first working train are in operation; the suction cups of the second train are not actuated;

(2) the second train is made to translate to a central position (in the middle of the front and rear beams), so that the transversal axis of the robot coincides with the rotation axis of change of course;

(3) the jacks are brought to a retracted position 1 so as to make the suction cups of the second train grip the wall;

(4) the actuator 7 is made to rotate in the direction of the robot's structure;

(5) the jacks 1 are brought to an extended position so as to make their suction cups grip the wall.

Figure 5:
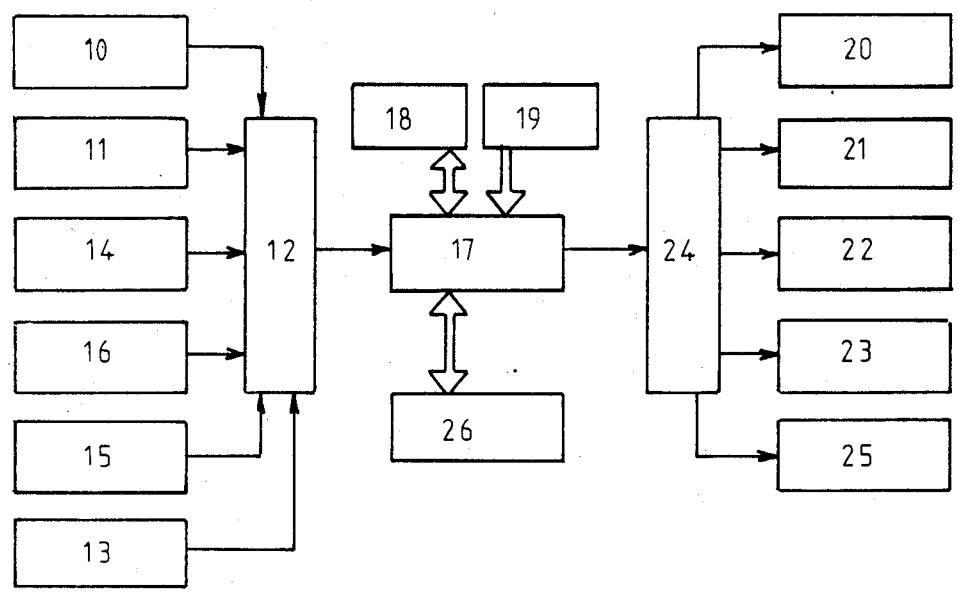
FIG. 5 is the electronic arrangement of the robot's control.

FIG. 5 shows the constructional arrangements of the control elements of the apparatus working like a robot.

The longitudinal displacement pick-up which is a coder 10 is connected to the input interface 12. Various types of coders may be suitable: incremental coder with an initialiser, absolute coder, potentiometric pick-up . . .

Each suction cup is provided at its central portion with a nearness pick-up. The said pick-up can be a nearness hit-or-miss sensor, an ultra-sound probe, a lack of pressure relay . . . .

It is this device that controls the position of the jacks.

Said pick-ups 11 are connected to the input interface 12.

In the case a robot arm is provided on the robot, the pick-ups 13 are connected to the input interface 12. As a variation a speed pick-up of the actuators' motors as well as the pressure pick-ups 16 of the air tank and the partial vacuum pick-up 15 of the suction cups are connected to the interface 12.

The input interface is connected to a micro-processor 17 also provided with a reading-writing storage 18, and a programme storage 19. The pneumatic distributors of the motor 20, the coupling distributor 21, the distributor for bringing the suction cups under partial vacuum by Venturi 22, the control distributor of the front and rear jacks 23 are connected to the output interface 24 as well as the actuators of a robotic tool arm 25, if necessary.

In case the robot operates over large surfaces, it is necessary to add a system of positioning 26 connected to the micro-processor by means of inlet and outlet gates.

In fact on a vertical or slanting wall, or on a ceiling, the robot is capable of positioning itself without the help of any additional system of positioning, merely by means of the "dead reckoning" method. The latter method consists of obtaining the sum of the displacement vectors corresponding to each step of the robot and to calculate its resultant. The said sum is obtained by means of longitudinal and rotational displacement coders. It will however be noted that there is an error attached to each displacement or rotation; this may be due to various causes:

(a) instrumental errors,
(b) slipping of the suction cups and distortion on the wall,
(c) mechanical plays, and
(d) positioning of the swivel joints 3 of the suction cups 2.

It should also be noted that the jacks cannot be immobilized independently one from the other in any one point of their course so as to allow the apparatus to be adapted to any out of true surface; this could also be a factor of inaccuracy.

In the case of relatively small surfaces, the robot can be programmed by means of a programmable erasable storage and by a classical method of learning: syntacter, point-by-point, numerical.

In the case of surfaces exceeding about 100 square meters, in the industrial treatment practice of ships' hulls, it becomes necessary to use a positioning system, for example by means of recognised target. The target or mark consists preferably of adhesive strips which bear networks of the "code bars" type, directed according to two perperdicular directions. The robot is advantageously fitted, on its arm, with a reader of the classical type, insensitive to external light, whose data is transmitted to the micro-processor. Such targets are arranged at regular interval defined in function of the robots accuracy; the latter is re-initialised on each target.

Ultra-sound, radio-frequency, stretch wire (polar coordinates) positioning systems can also be used and as all these systems are known they will not be described any further.

If the rotot is tele-activated, the system of positioning 26, FIG. 5 is replaced by the telecommunication device.

Figure 6:
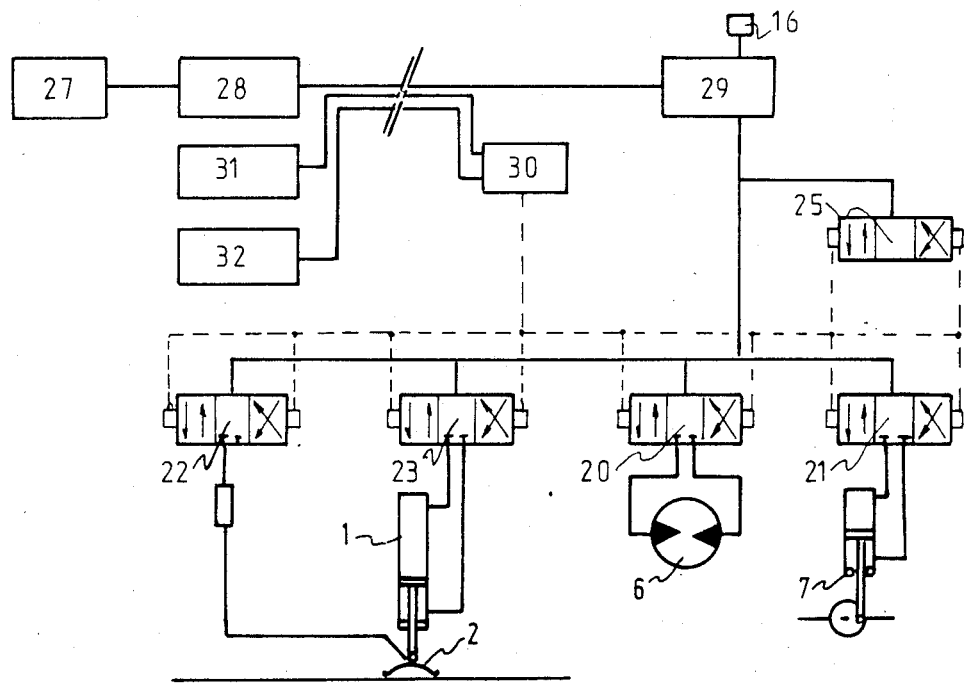
FIG. 6 is the pneumatic wiring diagram of the robot.

FIG. 6 represents the functional links between the various pneumatic components in case compressed air is used to operate the robot. It should be understood that other models according to the invention can be realised with electric, hydraulic or other actuators.

A compressor 27 supplies a tank 28. The compressed air is directed, by means of a flexible pipe, to a buffer tank 29 placed on the robot. The hollow metal structure of the robot can constitute the said tank. The pressure sensor 16 is connected to the tank 29. Distributors 22, 23, 20, 21 and 25 supply the various elements 1,2,6,7.

The micro-processor card of the central unit is connected to the control coil of the distributors. The remote control or urgent orders are established on the case 31 and transmitted by wire to the robot; the electric energy is transmitted from the case 32.

A various may be to make the robot independent by installation of an electric generator and compressed air on the working structure. In this case, remote control is carried out from a distance by radio waves, ultra-sounds or optical ray.

Figure 7:
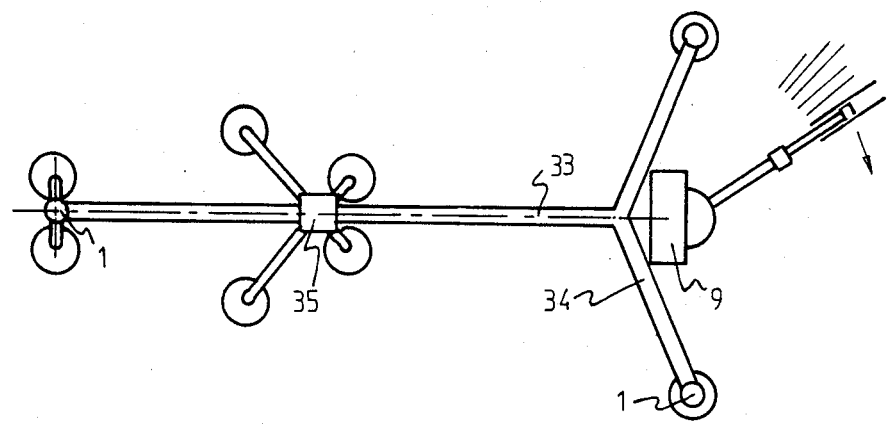
FIG. 7 is another robot seen from above.
Figure 8:
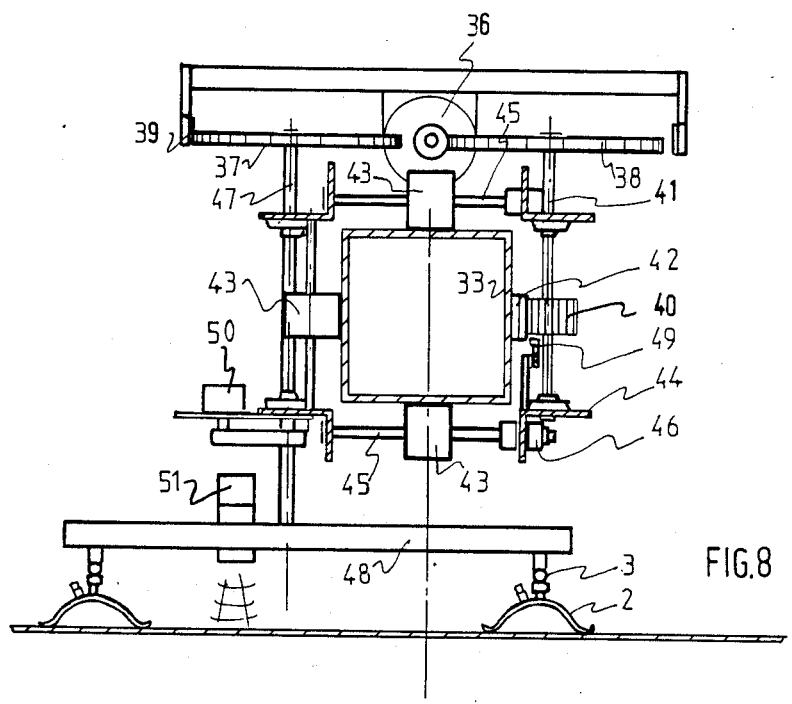
FIG. 8 is a translation and rotation device of the mobile train.

Another variation of the invention is shown in FIGS. 7 and 8.

A first train consists of a metal beam 33 connected at one of its ends to a jack supporting two suction cups, and at the other end to two beams 34 provided each with a jack provided in turn with a suction cup 1. This constructional arrangement is particularly advantageous if one is limited to a robot-tool. The second train 35 is provided with two suction cups placed close together on one side, and two suction cups placed apart on the opposite side; it is mobile along the beam 33. It should be noted that one suction cup may be replaced by several smaller ones coupled together. FIG. 8 is a diagramatic cross-section view perpendicular to the axis of the beam 33 of FIG. 7. A Pneumatic driving motor 36 can at will, drive one or the other of two pinions 37,38; the non-driven pinion is then immediately immobilised by means of a brake pad 39.

The pinion 38 engages with a gear 40 by means of an axle 41 supported on bearings and, on account of a rack 42 integral with the beam 33, ensures the translation movement of the mobile train. An arrangement of rollers 43 ensures holding while allowing the translation of the mobile train onto the beam 33. The rollers 43 are fixed onto the frame by means of an axle 45 provided with elastic blocks 46 to compensate the wear of the rollers. The other pinion 37 drives the compensation bar 48 bearing suction cups 2 in, rotation by means of means of an axle 47. A Cardan joint of a swivel joint 3, fixed between the suction cup 2 and the compensation bar 48 allows the apparatus to adapt to curve surfaces.

A displacement sensor 49 made of a Hall effect probe sends an impulse each time a tooth of the rack 42 goes by.

An absolute position coder 50 provides the angular position of the rotation of the compensation bar 48 in relation to the frame 44. An ultra-sound probe 51 allows the distance suction cup/wall to be estimated.

Figure 2:
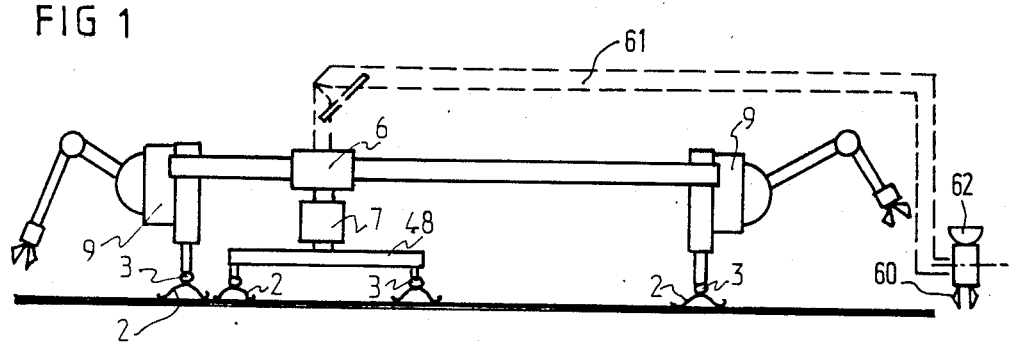
FIG. 2 is an elevated view of the same robot.
Figure 3:
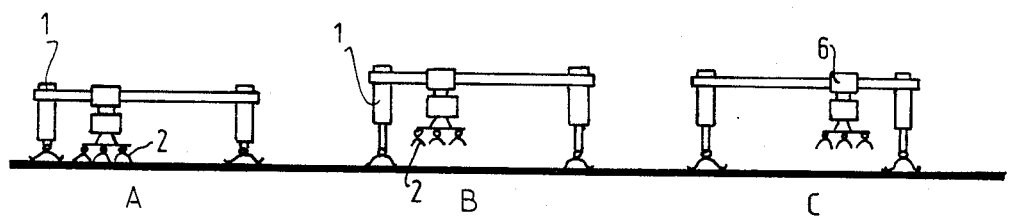
FIGS. 3 and 4 show, in succession the six positions necessary to perform one step.
Figure 4:
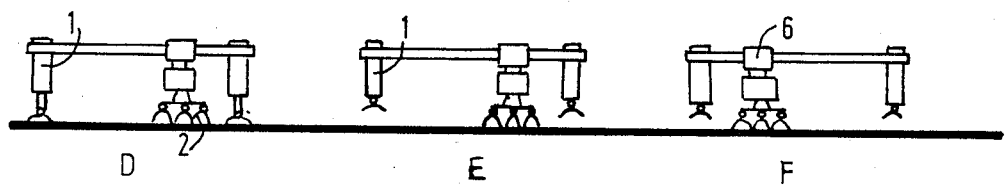

Another very interesting variation of the invention, made possible only by the rotation of the second train is as follows:

The tool 60 is supported on the second train by means of a rigid or articulated arm 61 as shown in broken lines in FIG. 2. The said arm passes above the first train. When the latter is fixed, the displacement devices 6,7 of the second train bring about the translation and rotation displacements of the tool along the surface. When the suction cups 2 of the second train are immobilised, by operation of the jacks 1, the same devices 6,7 are used for displacing the first train. According to one advantageous mode of embodiment the arm 61 supports furthermore an additional suction cup 62 which can come into action instead of the tool, for example thanks to a head mounted in a rotational manner. The said additional suction cup 62 completes the action of suction cups 2 supported by the second train and facilitates displacements on account of its considerable leverage arm.

It will also be noted that in the above description, it was supposed that beams 4, 5 were constituting the first train and that the compensation bar 48 remained within parallel planes. It is advantageous, in the case of surfaces the curvature of which is very high, or which comprise jutting out or re-entrant edges, to envisage a pivoting movement of the compensation bar 48 around an axis parallel to its plane and to provide said compensation bar with actuating means for such a pivoting action (not shown). Such an arrangement is interesting, more particularly for the inner cleaning of vats or ships' holds.

From what was explained above, it is apparent that the stability of the device depends upon the stresses exercised between the robot and the wall during treatment of the said wall.

In order to reduce the force transmitted to the robot during a brushing or scraping job which requires a considerable pressure for the work, without too considerable stresses to be transmitted to the suction cups, it is preferable to arrange, on the tool itself, means intended to ensure this working pressure. Said means consist advantageously of a submerged turbine propellent 65 (FIG. 10) which creates a water current in a direction perpendicular to the surface while moving away from the said surface; this generates, by reaction, a force which tends to push the tool 60 against the said surface. The tool can be a rotating brush mounted on the same axle as the turbine and rotating at the same speed or at a different speed on account of a reducer 66.

Another element intervening in the stability of the device and the accuracy of its functioning is the means of the grip-on devices, called 'suction cups' in this text, more particularly when they are placed at the ends of the jacks 1 or the arms 61, on account of their considerable overhang.

Figures 9, 10:
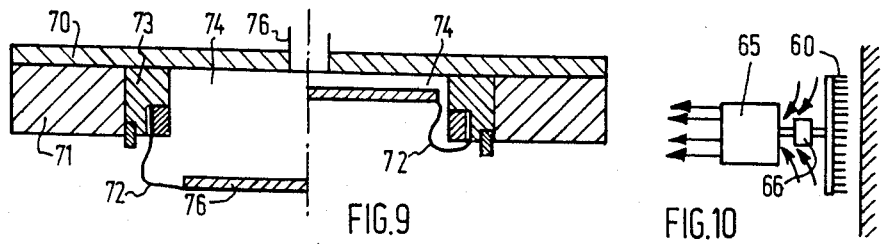
FIG. 9 is the cross-sectional view of a suction cup.
FIG. 10 is the side view of a tool.

This led the inventor to conceiving a suction-cup which is the subject of FIG. 9. The latter comprises a supporting plate 70 which bears, on its periphery, permanent magnets 71 of the ferrite type. This material combines to its magnetic properties, good antislip properties. In the centre, a flexible membrane 72 is fixed onto an annular wall 73 which is itself fixed in a tight manner onto the supporting plate 70. The membrane defines in this manner a closed chamber 74, connected by a conduit 75 to a supply source of working fluid which is preferably a non-lubricant liquid such as a water-glycol mixture. On the central zone of the inner face of the membrane 72 there is affixed a plate 76 of foam material which plays a double role: on the one hand it lends rigidity to the central portion of the membrane and helps it to retain a flat shape, and on the other hand, it constitutes a pressure damping device which affords time to intervene in the case of a small accidental leak. In the right hand left side of the FIG. 9, the chamber 74 is under partial vacuum and the membrane 72 plays the part of a suction cup, the action of which is added to that of the magnets 71 to hold the system in contact with the wall. In the left hand half side of FIG. 7, the chamber 74 is under high pressure, the magnets 71 have drawn away from the wall and the system does no longer grip the wall.

The present invention applies to painting, cleaning and preparing jobs on vertical and horizontal walls such as ships' hulls, aeroplane fuselages, ceilings of buildings not provided with scaffoldings; it is suitable for roller or aerosol painting, for signwriting or decoration of shop windows for example, for the cleaning of the windows and facades of buildings as well as for the inspection of cisterns of boats, in which case the tool is replaced by a camera; it is also suitable for inspection and repairs, under water, of marine platforms, for interventions on the metallic structures of buildings, the mounting of frames or the positioning of roofing from a distance by the crane operator.

I claim:

1. A mobile robot capable of moving and working along a non-planar surface, comprising a first support means and a second support means, means for operably connecting said second means to said first means for translation and rotation relative thereto; first and second gripping means mounted on said first and said second support means, respectively, said first gripping means comprising spaced devices forming a polygon which are arranged externally to the center of a second polygon defined by said second gripping means; means capable of displacing one of said first and said second means in a direction generally perpendicular to the surface; and an articulated arm means extending beyond the first support means and operably mounted on said second support means so as to be movable therewith, said articulated means comprising third selectively movable gripping means and means for holding a tool for working the surface, said second gripping means and said third gripping means cooperating to increase stability and adherence during movement of the robot along the surface.

2. The robot of claim 1, wherein said arm is capable of extending over said first means so as to perform work along the path which the robot will move.

3. The robot of claim 1, wherein said first gripping means comprises three spaced gripping devices.

4. The robot of claim 1, wherein said first polygon is a triangle.

5. The robot of claim 1, further comprising displacement sensing means associated with at least one of said first, second, and third gripping means.

6. The robot of claim 1, wherein at least one of said first, second, and third gripping means each comprise devices including magnetic gripping means.

7. The robot of claim 1, wherein at least one of said first, second, and third gripping devices each include devices including suction means.

8. The robot of claim 1, wherein at least one of said first, second, and third gripping means includes device comprising magnetic gripping means and suction means.

9. The robot of claim 1, wherein at least one of said first, second, and third gripping means comprise permanent magnets associated with a chamber of variable pressure, the wall of said chamber being turned towards the surface and comprising a flexible element so as to form a suction cup when the chamber is under partial vacuum and to exert a force generally perpendicular to the surface when the chamber is under high pressure so as to push said

10. The robot of claim 1, designed for amphibious use and further comprising a turbine operably connected to said arm proximate said two holding means, said turbine being immersed in water, and when actuated cooperating with the water to exert a force on the arm generally directed toward the surface.

11. An independent apparatus capable of moving along a non-planar surface, comprising a first train to which a second train is connected by means which allow a relative displacement to be obtained by translation and by rotation with a plane parallel to the surface, as well as first and second holding means supported respectively by the first and second train, capable of fixing the apparatus onto the surface in a removable manner; the said holding means of the first train being made of several grip-on devices which form a polygon and are arranged externally to the center of a polygon defining the holding means of the second train; the holding means supported by at least one of the trains being connected to the said train by means capable of displacing the said train in relation to the said holding means in a direction perpendicular to the surface; an inspection tool, the tool being mounted on an articulated arm associated with one of the trains in such a way as to be capable of moving from a working position to another working position by a pivoting movement relative to said arm, in a plane parallel to the said surface and in relation to the said first train, said tool also having third holding means thereon cooperating with said first and second holding means; said third holding means comprising permanent magnets associated with a chamber of variable pressure, the wall of said chamber, turned toward the surface, being constituted by a flexible wall which forms a suction cup when the chamber is under partial vacuum and pushes the surface magnets away from each other when the chamber is under high pressure.

* * * * *